Dec. 15, 1925.
J. M. DAYTON
1,565,715
REVOLUTION COUNTER AND TOTALIZER
Filed Dec. 15, 1924    2 Sheets-Sheet 1
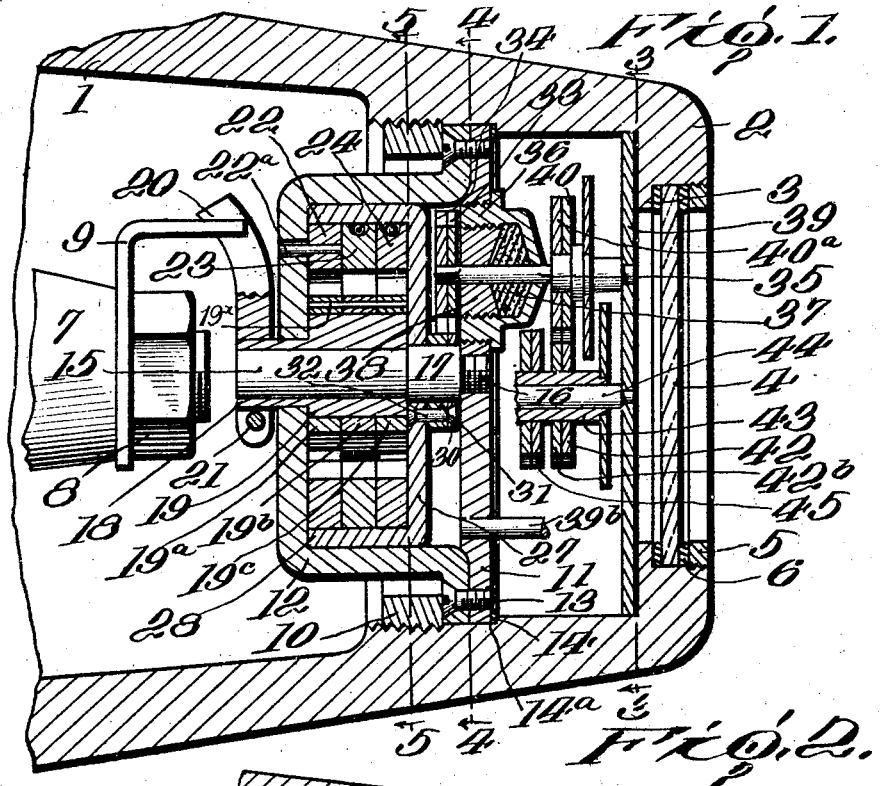
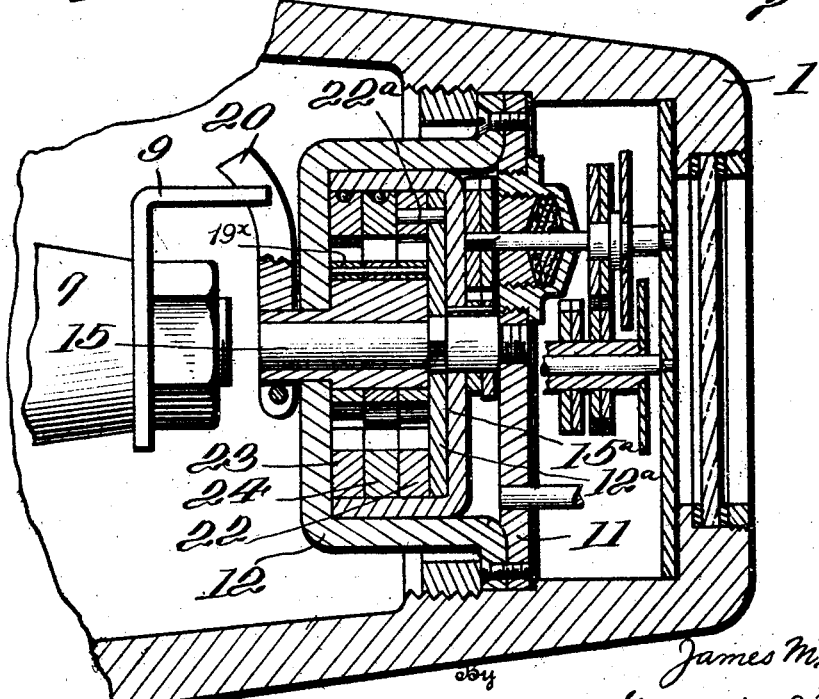
Inventor
James M. Dayton
by Sturtevant & Mason
Attorneys.

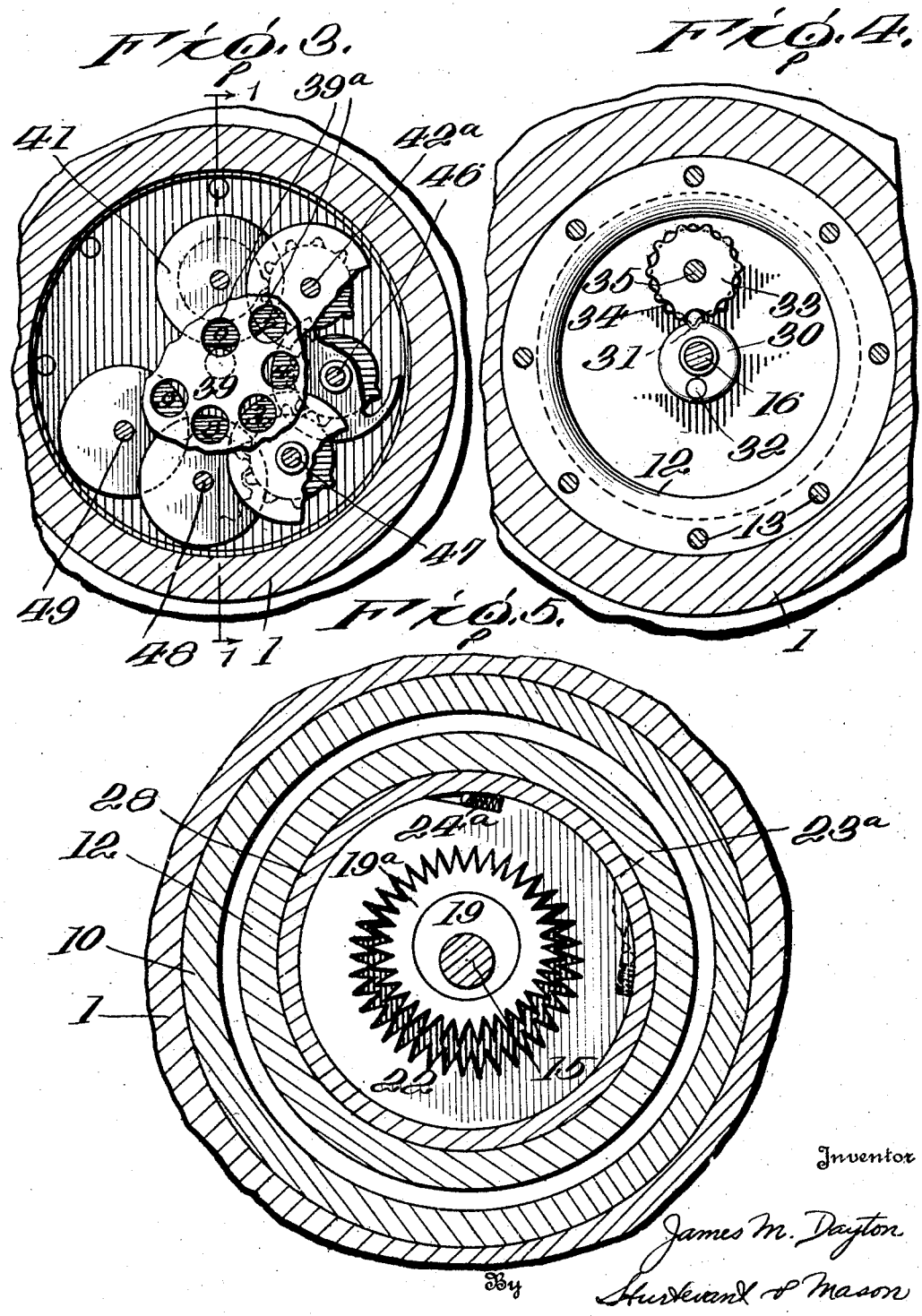

Patented Dec. 15, 1925.

1,565,715

UNITED STATES PATENT OFFICE.

JAMES M. DAYTON, OF HARTFORD, CONNECTICUT, ASSIGNOR TO THE DAYTON MANUFACTURING COMPANY, OF TORRINGTON, CONNECTICUT, A CORPORATION OF CONNECTICUT.

REVOLUTION COUNTER AND TOTALIZER.

Application filed December 15, 1924. Serial No. 756,016.

*To all whom it may concern:*

Be it known that I, JAMES M. DAYTON, a citizen of the United States, residing at Hartford, in the county of Hartford, State of Connecticut, have invented certain new and useful Improvements in Revolution Counters and Totalizers, of which the following is a description, reference being had to the accompanying drawing, and to the figures of reference marked thereon.

This invention relates to new and useful improvements in revolution counters and totalizers, and has more particularly for object the provision of a simple positively-actuated, entirely rotative mechanism for operating the registering train.

A further object is the provision of such a device whereby rotary movement in either direction may be registered as increments upon one and the same registering system, without the use of bevel gears, a pawl and ratchet, or other cumbersome direction-reversing devices.

A further object is the provision of such a device with a casing and packing joints whereby the registering train is protected from access of oil, grease and dirt, but the other moving parts may be in direct connection with and lubricated by the general lubricating system.

Another object is to provide a revolution counter and totalizer which may easily be removed or replaced without disturbing any positive connection.

With these and other objects in view, as will appear in the course of the following specification and claims, I have shown in the accompanying drawing, one form of execution of the revolution counter and totalizer, according to my invention, as a hub cap odometer, in which—

Figure 1 is an axial section of the odometer substantially on a vertical plane through the axis in Fig. 3, but having parts of the registering train omitted for greater clearness.

Fig. 2 is a view similar to Fig. 1, of a modified form of construction, and

Figures 3, 4 and 5 are sections at right angles to the axis respectively, on lines 3—3, 4—4 and 5—5, of Fig. 1.

The odometer is shown as contained within an auxiliary hub cap 1 which has an inwardly bent flange 2 and a small shoulder 3 at its outer end. This shoulder and flange are adapted to receive the glass pane 4 through which the dial readings may be observed. This pane is held in position by a locking ring 5, and it is preferable to insert between the shoulder and pane and between the pane and locking ring, the packing washers 6, which serve as a guard to exclude dust and water.

7 represents the front axle or other stationary part of a vehicle, with the retaining nut 8 thereon. A driving finger 9 is held on this shaft in a stationary position by the said nut 8.

The auxiliary hub cap may be removed at any time in the usual way, as there is no fixed relation between finger 9 and spur 20. The locking ring 10 may then be removed from the interior, and the odometer withdrawn as a unit for inspection or repairs.

The odometer elements are assembled on a base plate 11 and the cupped plate 12, which are held together by a series of screws 13. This assembly is held against a shoulder 14 of the hub cap 1 by the locking ring 10. A packing washer 14ª is interposed to prevent access of oil.

Referring now to the assembly of the driving mechanism for the registering system, 15 designates the shaft which is threaded at 16 for reception in the base plate 11. Intermediate its length, this shaft 15 has a collar 17. At its free end, the shaft projects through the cupped plate 12.

Mounted loosely on the outer end of the shaft 15 and journaled in the cupped plate 12 is a sleeve 18 having an eccentrically cut collar 19 on its inner end. This collar 19 serves as a bearing for eccentric gears 19ª, 19ᵇ and 19ᶜ, these gears being guided between the collar 17 and the cupped plate 12 and rotated positively together by a pin 19ˣ. A rotating arm 20 is fastened on the outer end of this sleeve 18 by a clamping screw 21, and serves by contact with the driving finger 9 on the axle to hold the eccentric axis 19 on the spur gears 19ª, 19ᵇ and 19ᶜ in a predetermined position.

These eccentric gears 19ª, 19ᵇ and 19ᶜ, mesh respectively with the three internal gear rings 22, 23 and 24, which are respectively cut with 67, 68 and 66 teeth, or other series of teeth depending upon the external diameter of the tire casing. The gear ring 22 is secured in fixed relation to the cupped plate 12 and hence to the hub cap 1 itself, by a pin 22ª. The gear rings 23 and 24 are each provided with a series of ball clutches 23ª and 24ª, respectively, on their outer faces; these clutches are preferably six in number for each gear, and all act in the same direction.

In actual construction, I find that the gears 22, 23 and 24 may each be 1.7 inches in pitch diameter with respective pitches of 39.4, 40 and 38.8. The spur gears 19ª, 19ᵇ and 19ᶜ for smooth running may be cut with sharp teeth in three sections, each meshing with one of the gears 22, 23 and 24, and each of fifty-four teeth at 40 pitch and 1.35 inches pitch diameter. The spur gear portion 19ᶜ is cut to .054 inches as a normal depth; the spur gear portion 19ª may be cut .020 inches deeper; and the gear 19ᵇ cut .010 inches deeper than normal, to correspond with the difference in pitches of the corresponding internal gears 22 and 23 from 40 pitch to assure easy running.

Loosely mounted on the collar 17 and bearing against the cupped plate 12 and forming therewith a cavity enclosing gear rings 22, 23 and 24, is a dished plate 27 having a peripheral flange 28. The flange 28 engages with the ball clutches 22ª and 24ª, and is driven thereby in an invariable direction. A gear 30, mutilated to have only one tooth, and a Geneva plate 31 (Fig. 4) are fastened rigidly to the dished plate 27 by a rivet 32, or any other appropriate means, for positive movement therewith around the axis of the shaft 15.

Meshing with the one-tooth gear 30 is a ten-tooth gear 33 having secured thereto a second and meshing Geneva plate 34. These members 33 and 34 are mounted on the driving shaft 35 for the registering system. This shaft may be provided with a square end or other means for locking these two members together in a positive driving connection. It is apparent that the function of the one-tooth gear 30 is to drive the ten-tooth gear 33 by one tooth for every relative rotation of the dished plate 27 with regard to the base plate 11. During the time when the mutilated portion of the gear 30 is passing the gear 33, the Geneva plates 31 and 34 prevent rotation of the gear 33.

The driving shaft 35 passes through the stuffing box bearing 36 which is secured tightly into the base plate 11. A suitable packing 37 of wicking is placed within the cavity of the bearing 36 and compressed therein by a packing disk 38 to form an oil-tight joint around shaft 35 to prevent access of oil to the registering train.

The other end of the driving shaft 35 is guided in the dial plate 39 of the registering system. Immediately inside of the bearing 36, the shaft 35 carries a one-tooth driving gear 40, and an indicating disk 41 is rigidly mounted on this same shaft at an appropriate distance from the dial plate 39, and bears thereon the digits in regular order, to be displayed through openings 39ª in the dial plate, as shown in Fig. 3. A Geneva plate 40ª is likewise mounted rigidly on the shaft.

For the purpose of better illustration, the "units" gear is shown in Figures 1 and 2 as immediately beneath the "tenths" gear and meshing therewith. It will be understood that these figures are to this extent diagrammatic, and that the preferred arrangement in practice is shown in Fig. 3.

The one-tooth gear 40 on the main driving shaft meshes with the ten-tooth gear 42 on the auxiliary shaft 44 which may be designated as the "units" shaft. This gear 42 is mounted on a sleeve 43 carried on the shaft proper 44, which is guided and held in position between the base plate 11 and the dial plate 39. Likewise rigidly mounted on this sleeve 43 is a Geneva plate 42ᵇ meshing with Geneva plate 40ª, and a further one-tooth gear 45, which in turn meshes with a ten-tooth gear on a "tens" shaft 46. The latter in turn has a one-tooth gear which meshes with a ten-tooth gear on the "hundreds" shaft 47. In a similar way, a complete rotation of shaft 47 is transmitted as a tenth revolution of the "thousands" shaft 48, which in turn, operates intermittently the "ten-thousands" shaft 49, at one-tenth its own rate. It will be seen that this is an ordinary type of registering mechanism, with the addition of Geneva plates to prevent untoward movements, and permits the successive display beneath the windows 39ª in the dial plate 39 of indications of the total distance in units and tenths traversed by the vehicle. The Geneva plates referred to may be of the type shown in Fig. 4, and need not be separately illustrated.

The dial plate 39 and base plate 11 are held in spaced relation by pillars 39ᵇ or the like.

The operation of the device is as follows: Assuming that the device is mounted on the left front wheel of an automobile vehicle, that this wheel is of such a diameter as to make 680 revolutions per mile, and that the vehicle is moving forward, then the driving finger 9 will retain the spur 20 and thereby the sleeve 18 against rotation, and the hub cap and its associated elements, i. e., the base plate 11 and the cupped plate 12, will turn counter-clockwise around the stationary eccentrically journalled gears 19ª, 19ᵇ and 19ᶜ. Moving in this direction, the gears 19ª, 19ᵇ and 19ᶜ will mesh with the three internal gear rings 22, 23 and 24. Inasmuch as there is a difference in the number of teeth in the three gears, the two free gear rings 23 and 24 will each have a relative movement with regard to the fixed gear ring 22, gear 23 with 68 teeth turning rearward and gear 24 with 66 teeth turning forward with regard to the base plate 11 by one tooth division of each of these gears for each revolution of the wheel. The 68 tooth gear 23 rotating clockwise past the 66 tooth gear 24, the ball clutches 23ª drives the dished plate 27 clockwise at its own speed; and plate 27 slips freely past the rotating gear 24.

The 68-tooth gear 23 therefore, rotates the plate 27, and therewith the mutilated gear 30, one revolution per 68 revolutions of the left front wheel of the vehicle in the "forward" direction. The mutilated gear 30 during this rotation, advances the "tenths" dial by one division. The registry in the forward direction is therefor, in this instance, exact for the assumed 680 revolutions per mile, corresponding to a tire casing diameter of about thirty and one-half inches.

The "reverse" drive is obtained as follows:—The wheel being assumed in rotation in direction opposite to that previously, the gears 19ª, 19ᵇ and 19ᶜ mesh with gear rings 22, 23 and 24, and drive them as before, but 23 and 24 each in the opposite direction.

The gear ring 23 still moves more swiftly than gear ring 22, and gear ring 24 always loses one tooth at each revolution, i. e., gear ring 24 is rotating backwardly with regard to the base plate 11, or in the same direction with regard thereto as gear ring 23 was rotating in the former case. The ball clutches 24ª now enable gear ring 24 to drive the dished plate 27 in its invariable direction: and ball clutch 23ª allows slipping between plate 27 and gear ring 23.

In this case, sixty-six revolutions of the wheel represent one revolution of gear 30; since rearward travel forms a very small portion of total travel, this error is not serious.

Since the ball clutches 23ª and 24ª will engage at any point of the dished plate 27, it is apparent that any small or irregular movements in the two directions greater than the wheel circumference will be added up the same as travel for long distances.

In the modified form shown in Fig. 2, the gear rings 22, 23 and 24 are placed in a somewhat different relation; and gear ring 22 is fixed to a separate plate 12ª carried and retained on a squared portion 15ª of shaft 15. The operation is the same as before.

It is obvious that minor changes in the details of construction and the arrangement of the parts may be made without departing from the spirit of the invention as set forth in the appended claims. For example, it is possible to mount the driving members stationary and to have a rotating finger 9 serve as the actuating member. The relative number of teeth on gears 22, 23 and 24 are proportioned to the external diameter of the tires or transmission ratios, so that the dial indications are a presentation of the distance covered in the particular units selected.

Having thus described the invention, what I claim as new and desire to secure by Letters-Patent, is—

1. In a revolution counter, a registering train having a frame, an element having a rotative movement relative to said frame, a member having gear teeth on its periphery and mounted on an eccentric journal on said element, a pair of rings having a different number of teeth and meshing with said gear teeth, and means to transmit the differential movement between said rings to the said train.

2. In a revolution counter, a registering train having a frame, an element having a rotative movement relative to said frame, a main frame, an internally toothed ring on said main frame, a second ring having a greater number of internal teeth than said first ring, a third ring having a lesser number of internal teeth than said first ring, means responsive to the rotation of said element to actuate said second and third rings from and relative to said first ring, and means to transmit said relative actuation to said train.

3. In a revolution counter, a registering train having a frame, an element having a rotative movement relative to said frame, a main frame, an internally toothed ring on said main frame, a second ring having a greater number of internal teeth than said first ring, a third ring having a lesser number of internal teeth than said second ring, means responsive to the rotation of said element to actuate said second and third rings from and relative to said first ring, and means to transmit said relative actuation to said train.

4. In a revolution counter, a registering train, a frame, an element having a rotative movement relative to said frame, and devices to transmit said movement to said train including internally meshed gear trains and selective clutches therefor to reduce the ratio of transmission and to rectify movement resulting from the reverse rotation of said element.

5. In a revolution counter, a stationary shaft, a driving sleeve mounted on said shaft and having an eccentric gear seat thereon, gears journaled on said seat, a pair of internal gears of unlike number of teeth to mesh with two of said gears, a third internal gear to mesh with another of said gears and fixed relative to said shaft, a member rotatable independently of said shaft and said gears, and a pair of ball clutches on said respective first rings to drive said member in invariable direction, whereby movement of said sleeve in either direction is translated into movement of said member in the same direction.

6. In a revolution counter, a stationary shaft, a driving sleeve mounted on said shaft and having an eccentric gear seat thereon, gears journaled on said seat, a pair of internal gears of unlike number of teeth to mesh with two of said gears, a third internal gear with unlike number of teeth to mesh with another of said gears and fixed relative to said shaft, a member rotatable independently of said shaft and said gears, and a pair of ball clutches on said respective first rings to drive said member in invariable direction, whereby movement of said sleeve in either direction is translated into movement of said member in the same direction.

In testimony whereof, I affix my signature.

JAMES M. DAYTON.